Feb. 20, 1968 C. A. BENKERT, JR 3,369,589
PLEATED CURTAIN CONSTRUCTION
Filed Dec. 11, 1964 4 Sheets-Sheet 1
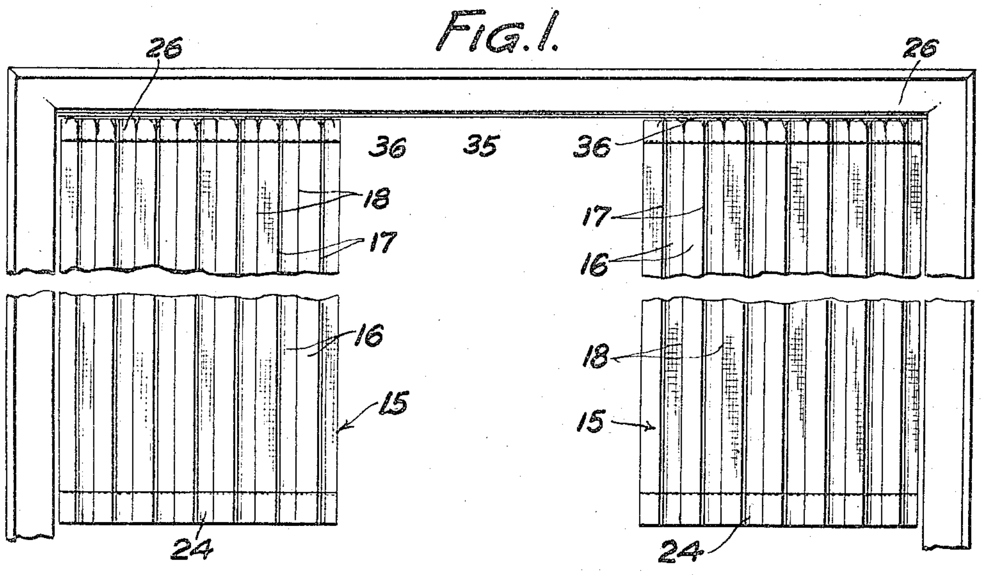
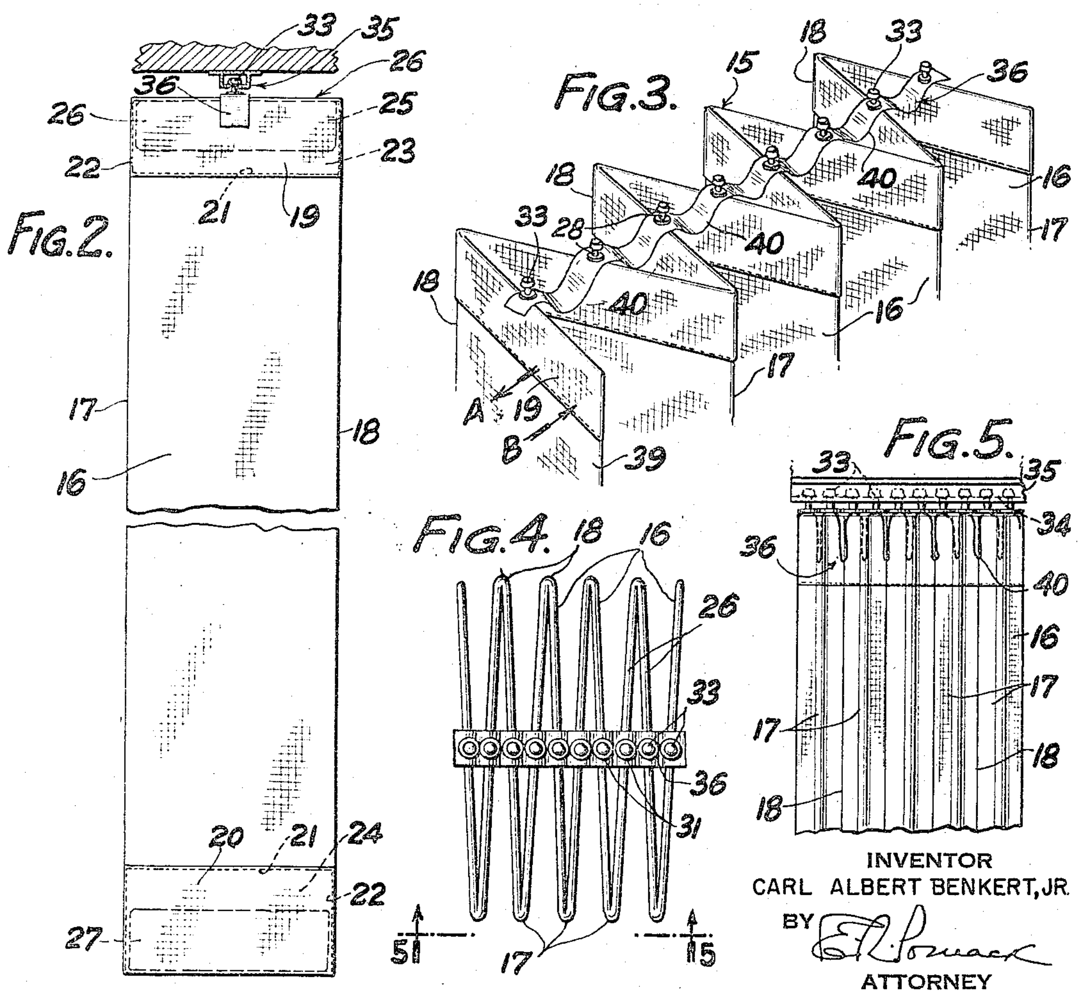
FIG. 2, FIG. 3, FIG. 4, FIG. 5
INVENTOR
CARL ALBERT BENKERT, JR.
BY
ATTORNEY Feb. 20, 1968 C. A. BENKERT, JR 3,369,589

PLEATED CURTAIN CONSTRUCTION

Filed Dec. 11, 1964 4 Sheets-Sheet 2

INVENTOR
CARL ALBERT BENKERT, JR
BY [signature]
ATTORNEY

INVENTOR
CARL ALBERT BENKERT, JR.
BY
ATTORNEY

PLEATED CURTAIN CONSTRUCTION

Filed Dec. 11, 1964

4 Sheets-Sheet 4

INVENTOR
CARL ALBERT BENKERT, JR.
BY [signature]
ATTORNEY

United States Patent Office 3,369,589
Patented Feb. 20, 1968

3,369,589

PLEATED CURTAIN CONSTRUCTION

Carl Albert Benkert, Jr., Birmingham, Mich., assignor, by mesne assignments, to Isabel Scott Fabrics Corp., New York, N.Y., a corporation of New York Filed Dec. 11, 1964, Ser. No. 417,613
2 Claims. (Cl. 160—84)

This invention relates to curtain constructions, and is particularly directed to traversing curtains and drapes suspended from a ceiling or wall track and adapted to be drawn into extended and retracted positions.

Conventional drapes of the above-mentioned category are generally of pinch-pleat construction, an arrangement that is necessary to produce a gathering of the fabric for the effect of fullness. In such a construction the relatively thick and soft folds extending down from each pleated section at the heading become progressively wider, often resulting in a drape somewhat wider at the bottom than at the top. The necessary bulkiness of such conventional curtains makes them uneconomical to store, and also causes them to obscure valuable window space due to the combined thickness of the folds and panels when the drapery is fully drawn back. Due to the necessarily loose and soft fold construction, and the divergent fold lines of such conventional drapes, the panels between the folds are generally uneven and of unequal widths, thereby producing an irregular and unsightly appearance. Moreover, the non-parallel fold lines render such curtains unsuitable for use in modern or contemporary decorator designs where simplicity and the regularity of parallel lines are required. Another shortcoming of said conventional curtains is that they require special and costly fittings to enable them to be used with traverse tracks. The latter fact, together with the cost of fabricating pinch-pleat curtains and slidably securing them to tracks, make their use at times prohibitively expensive.

It is the objective of this invention to provide aesthetically attractive curtains and drapes with permanently pleated sections, and having none of the aforesaid shortcomings of conventional pleated constructions. More specifically, among the objects of the present invention are the provision of traversing curtains and draperies (1) with simple heading treatment, (2) with folds extending downwardly in sharply defined parallel lines so as to be suitable for both modern and traditional decors, (3) with pleating that produces the desired effect of fullness, (4) with panels of equal widths, (5) with means to limit the extent of unfolding of the pleated sections when the curtain is in its maximum extended position, whereby the fold lines are maintained at predetermined uniformly spaced intervals and (6) with carrier means for slidable engagement with traverse tracks and which are incorporated into the body of the curtain heading as stiffening means.

Further objects of the invention are the provision of a curtain construction having the aforesaid advantages and which can be folded into compact form for economical storage and shipment, and which, when operatively installed, can be drawn back into a contracted form with folds presenting trim, clean and thin lines and presenting a comparatively wide window opening.

And it is my objective to provide a relatively inexpensive and easily fabricated curtain construction having the features and advantages above mentioned.

Other objects, features and advantages will appear from the drawings and the description hereinafter given.

In the accomplishment of the aforesaid objects I employ a curtain fabric folded accordian fashion, with top and bottom pockets for each panel, the top pockets constituting the curtain heading and receptacles for my novel form of combination heading stiffener and carrier slide member, the bottom pockets constituting receptacles for weighted bottom hem stiffener members. Each of the said combination stiffener and carrier slide members has an upwardly extending stem provided with a slide element for sliding engagement with a suitable track member of conventional construction attached to the ceiling or wall. A flexible tape is attached to retainers on all of the said stems, the length of said tape being such that whent it is fully extended the accordian folded panels will be restrained against unfolding beyond a predetermined amount, and when the curtain is operatively drawn back the free portions of the tape will fold downwardly and drop gravitationally into the spaces between the adjacent panels, said tape being at all times in non-interfering relation with the operation of the carrier members—all as will more clearly appear from the description hereinbelow given.

In the drawings:

FIG. 1 is a front view of a pair of curtains according to my invention, the curtains being shown suspended from a track at the upper portion of a window and in partly open position.

FIG. 2 is an enlarged front view of one of the panels of the curtain construction of FIG. 1, with parts broken away, the track and window frame portion being shown in section.

FIG. 3 is a fragmentary perspective view of the accordian-folded panels of my invention shown in partly extended position, the track member being omitted.

FIG. 4 is a fragmentary top view of the curtain construction of FIG. 3, but shown in its fully retracted position.

FIG. 5 is a fragmentary front view of FIG. 4 looking in the direction of arrows 5—5, this view showing the slide members operatively disposed within a track member.

Figures 6, 7:
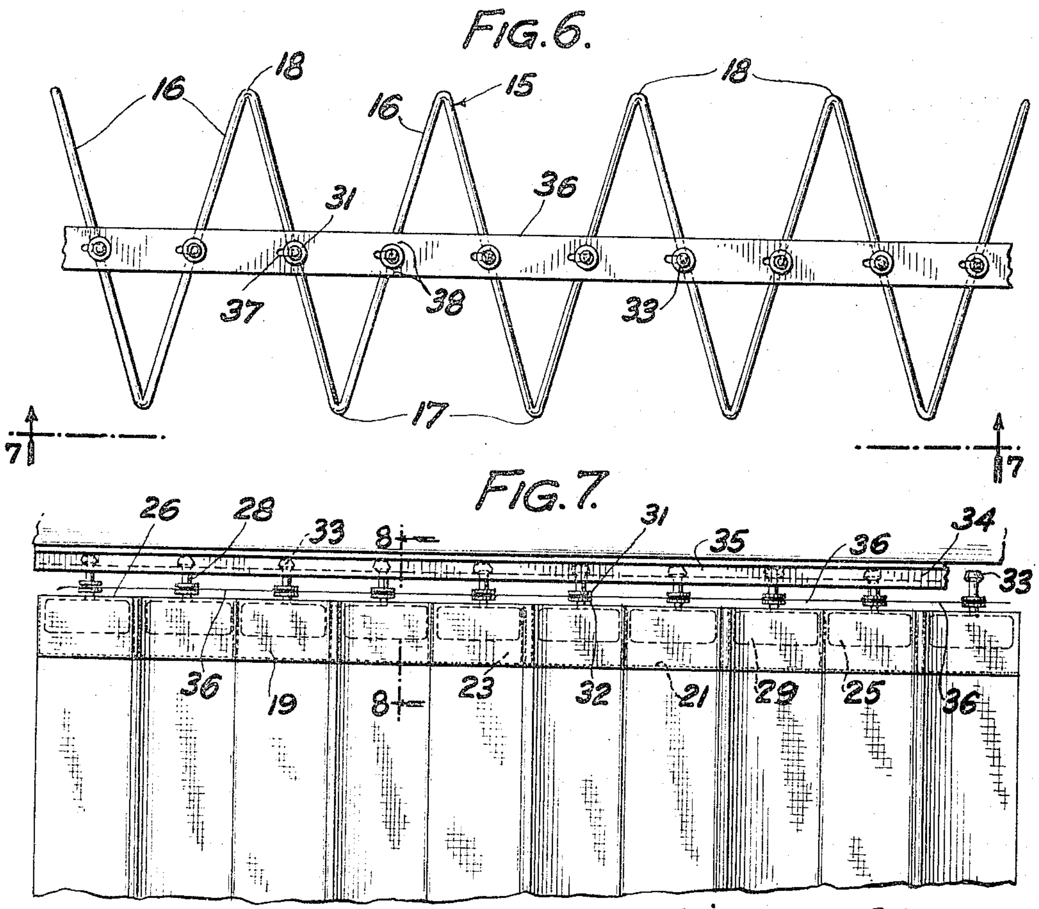
FIG. 6 is a top view of the curtain construction of FIG. 3 shown in its fully extended position.
FIG. 7 is a fragmentary front view of FIG. 6, looking in the direction of arrows 7—7, and showing the slide elements operatively disposed within a track member.
Figure 9:
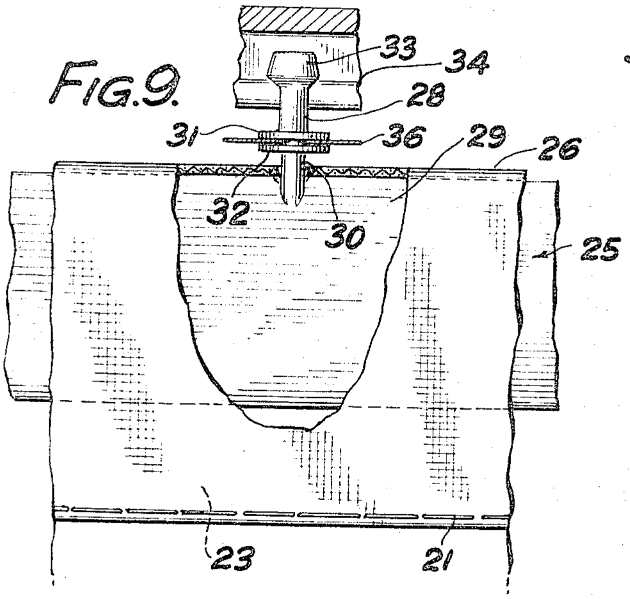
FIG. 9 is a section of FIG. 8 taken along line 9—9.
Figure 8:
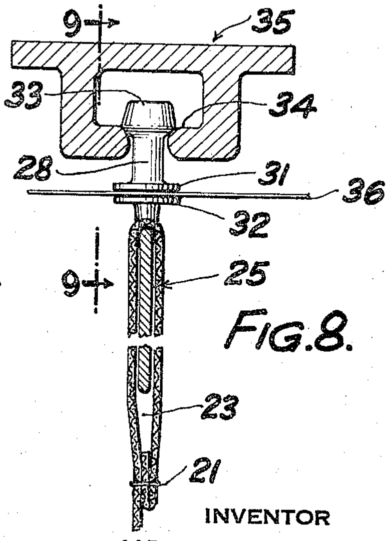
FIG. 8 is an enlarged fragmentary section of FIG. 7 taken along line 8—8.
Figure 10:
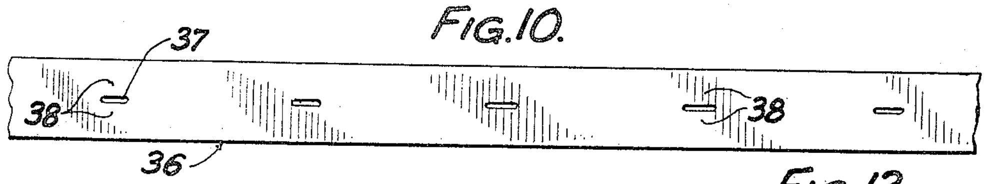
FIG. 10 is a fragmentary top view of a tape member of the curtain construction shown in the foregoing figures.
Figure 11:
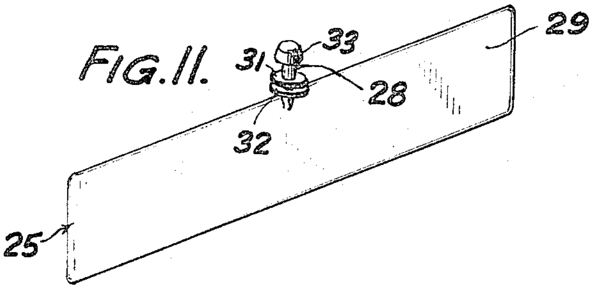
FIG. 11 is a perspective view of the combination heading stiffener and carrier member employed in the curtain construction of the foregoing figures.

In the form of my invention illustrated in FIGS. 1 to 11, the pleated body portion, generally designated 15, comprises a plurality of accordian-folded panels 16 presenting a plurality of well-defined alternate front and rear vertical parallel fold edges, the front fold edges being identified by the reference numeral 17 and the rear fold edges by the reference numeral 18. The upper and lower portions of the curtain material are folded over to form hems 19 and 20, respectively, said hems being closed by horizontal stitches 21 and vertical stitches 22 to form the respective upper and lower pockets 23 and 24. The upper pockets 23 each contains therein a flat, relatively stiff member 25, preferably, although not necessarily, of suitable sheet plastic material, said members 25 extending substantially across the widths of the respective pockets 23. The arrangement is hence such that each of the pockets 23 constitutes a stiffened heading section, generally designated 26. Each of the bottom pockets 24 contains a flat, relatively stiff weighted member 27 extending substantially across the width of the pocket. The arrangement is hence such that each of the said panels 16 is maintained throughout its length in flat condition, due to coactive action of said members 25 and 27, the fold edges 17 and 18 being consequently maintained in vertical parallel relation.

In the above-described embodiment of my invention each of the members 25 contains an upwardly extending stem 28 integral with the wide inner body portion 29, each of the stems protruding upwardly through the respective apertured portions 30 at the upper edges of said heading sections 26. Fixedly secured to each of said stems 28 are the spaced retainer elements 31 and 32 adapted to retain therebetween a tape member 36 to be hereinbelow described. Each stem also contains at the upper end thereof the slide element 33 adapted for slidable and rotatable engagement with track 34 of the conventional traverse member 35. The arrangement is such that the member 25 is suspended from the track member, is slidably movable therealong, and is rotatable in different angular positions in relation to the longitudinal extent of the track. It is thus apparent that member 25 constitutes a combinaion heading stiffener and carrier member, serving the double function of maintaining the heading of each panel in flat condition and operatively engaging a curtain-supporting track member attached either to a ceiling or wall.

Extending over the top of the entire body portion 15 of the curtain is the flexible expansion-limiting tape 36, said tape having therein along its length a plurality of spaced apertured portions 37 preferably, although not necessarily, in the form of narrow slits. The said tape 36 is operatively applied to said stems 28 of the respective members 25 by slipping its said apertured portions 37 over the respective slide elements 33 and downwardly along the stems and over the upper retainer elements 31 to a position at which the portions 38 of the tape adjacent and surrounding the respective apertured portions 37 are disposed between the said retainer elements 31 and 32. In the particular embodiment illustrated the tape 36 is securely maintained in place due to the use of the narrow slit apertures 37 and the consequent relatively large surrounding area 38 engageable by said retainer elements 31 and 32. In the preferred arrangement each stem 28 is positioned midway of the corresponding body portion 92, and said apertured portions 37 are equally spaced from one another.

The length of the tape 36 is predetermined so that when it is in its fully extended position, as shown in FIG. 6 it will hold the panels 16 in predetermined maximum angular relation to one another. In other words, the tape 36 serves the function of restraining the pleated body portion 15 against expansion beyond a predetermined amount; and since, in the preferred arrangement illustrated, the said apertured portions 37 are equally spaced, the vertical fold edges 17 and 18 are also equally spaced from one another.

When it is desired to expand the curtain to its maximum predetermined width, all that need be done is to grasp the end panel 39 and draw the entire curtain in the direction of the arrow A (FIG. 3), whereby the slide elements 33 will slidably move along the said track 34, in known manner, to enable the curtain to be fully extended to the position shown in FIG. 6. When it is desired to retract the curtain, the said end panel 39 is again grasped and the body portion folded together by slidably moving it in the direction of arrow B. It is understood that the expanding and contracting operations can, within the intent of this invention, be performed by the employment of conventional cord-operated curtain drawing means known to those skilled in the art. During the last-mentioned retracting operation, the free portions 40 of the tape 36 disposed between the respective stems 28 will fold downwardly between the adjacent panels, as clearly indicated in FIG. 3, the downward folding being gravitational if the tape is of relatively limp material. The tape, because of its flexibility, does not interfere with the retraction of the curtain; and since said tape can be of relatively thin material, the entire body portion 15 of the curtain can be folded into a relatively narrow width, as indicated in FIG. 5—a condition which is aided by the fact that the body portion of each of the panels 16 is of flat single sheet material with well-defined folds 17 and 18.

It is further to be noted that since the tape is maintained in position by the retainer members 31 and 32 above the top edges of the respective panels, and spaced below the respective slide elements 33, the tape is at all times maintained in a non-interfering position with respect to the panels 16 and the track member 35 during the operative folding and unfolding movements of the curtain.

Figure 12:
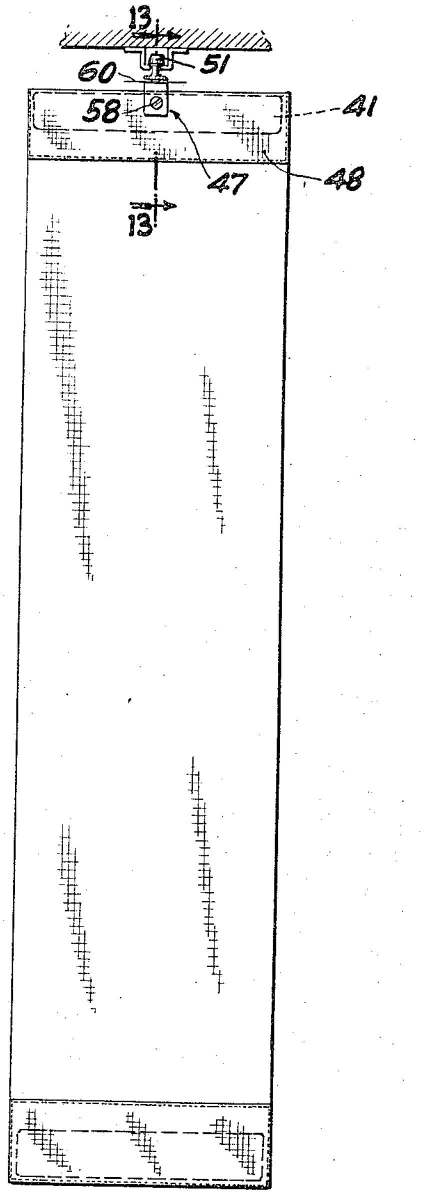
FIG. 12 is a front view of a panel construction according to a modified form of my invention.
Figure 13:
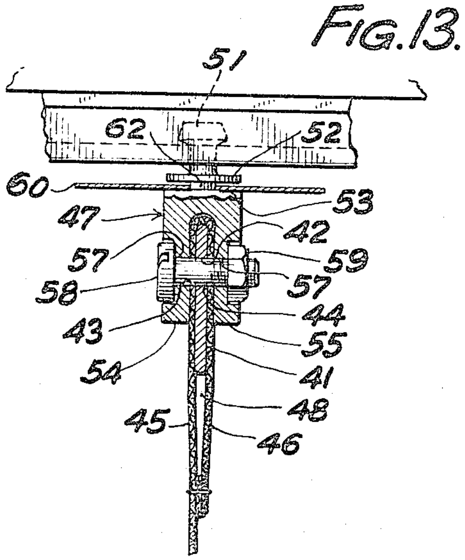
FIG. 13 is an enlarged section of FIG. 12 taken along line 13—13.
Figure 15:
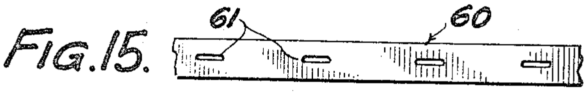
FIG. 15 is a fragmentary top view of the tape employed in the construction of FIGS. 12 to 14.
Figure 14:
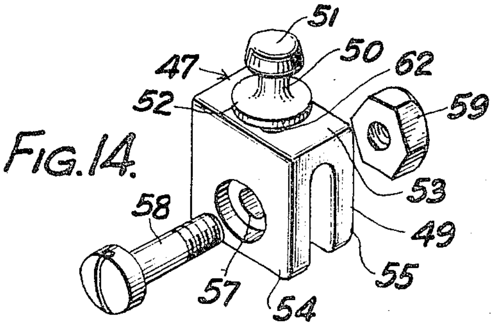
FIG. 14 is a perspective view of the carrier member illustrated in FIGS. 12 and 13, the fastener members being shown detached from the body portion of said member.

In the form of my invention illustrated in FIGS. 12 to 14, each of the respective heading pockets 48 contains therein a flat stiffener member 41 substantially like the body portion 29 of the above-described member 25, but without the stem 28. Each stiffener member contains centrally thereof an apertured portion 42 in registry with the opposite apertured portions 43 and 44 of the respective sides 45 and 46 of said heading pocket 48. A carrier member 47 is placed over the tops of each of the respective heading portions 48 of the respective panels, each of said members 47 comprising a channel-like body portion 49, an upwardly extending stem 50, a slide element 51 at the top of the stem and a retainer element 52 spaced below said slide element 51 and above the upper wall 53 of said channel-like body portion 49. The latter portion 49 contains the two parallel spaced walls 54 and 55 which are in flanking engagement with the opposite walls 45 and 46 of the pocket heading 48, the top wall 53 being disposed over the upper edge 56 of the corresponding pocket portion. The said walls 54 and 55 contain a pair of aligned holes 57 in registry with the said apertured portions 42 and 43 of said heading walls 45 and 46 and said apertured portion 44 of said stiffener 41, and adapted to operatively receive the shank of the screw 58. In operatively assembling member 47 in place, the screw member 58 is inserted into holes 57, 42, 43 and 44 and the nut 59 secured to the outwardly extending opposite end of the screw 58. The arrangement is hence such that each pocket 48 is provided with a heading stiffener and with a carrier member adapted for slidable engagement with suitable traverse track means.

The tape 60 is substantially like tape 36, with a plurality of spaced apertured portions 61 therein. The tape is placed in position by applying the said apertured portions 61 over the respective slide elements 51 and moved downwardly until the portions of the tape surrounding the respective apertured portions 61 are disposed in the spaces 62 between the respective retainer elements 52 and walls 53. The tape, operatively positioned, is illustrated in FIG. 13, and is adapted to serve its function precisely in the manner of the tape 36 first above described.

Figure 16:
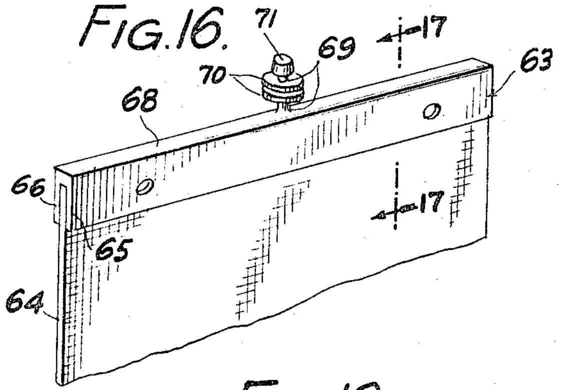
FIG. 16 is a fragmentary perspective view of another modification of my invention.
Figure 17:
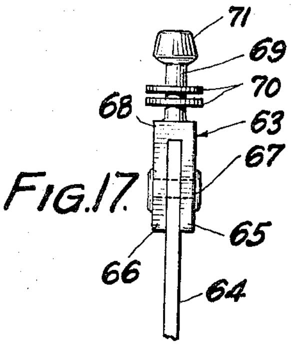
FIG. 17 is a section of FIG. 16 taken along line 17—17.

The embodiment of my invention shown in FIGS. 16 and 17 comprises the channel-like carrier member 63 positioned over and secured to the upper portion of the curtain panel 64, the length of the carrier member being substantially the same as the width of the panel. In this construction there is no internal stiffener member, the walls 65 and 66 serving as stiffeners applied to the opposite faces of the panel. Fasteners 67 (not shown in FIG. 16) secure member 63 to the panel in known manner. Extending up from the upper wall 68 of said carrier member 63 is stem 69, tape retainer 70 and slide element 71 operative in the manner of the corresponding elements in the forms above described.

Figure 18:
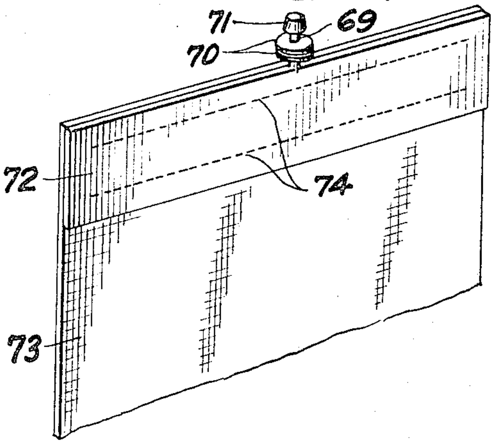
FIG. 18 is a fragmentary perspective of still another modification of my invention.
Figure 19:
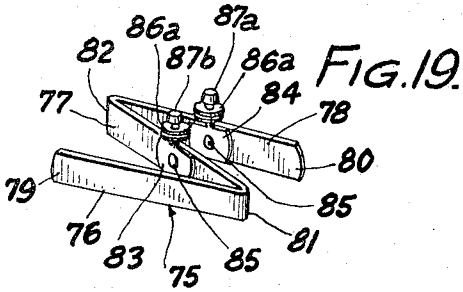
FIG. 19 is a perspective view of a fixed carrier device adapted for attachment to three end panels of my curtain construction.
Figures 20, 21, 22:
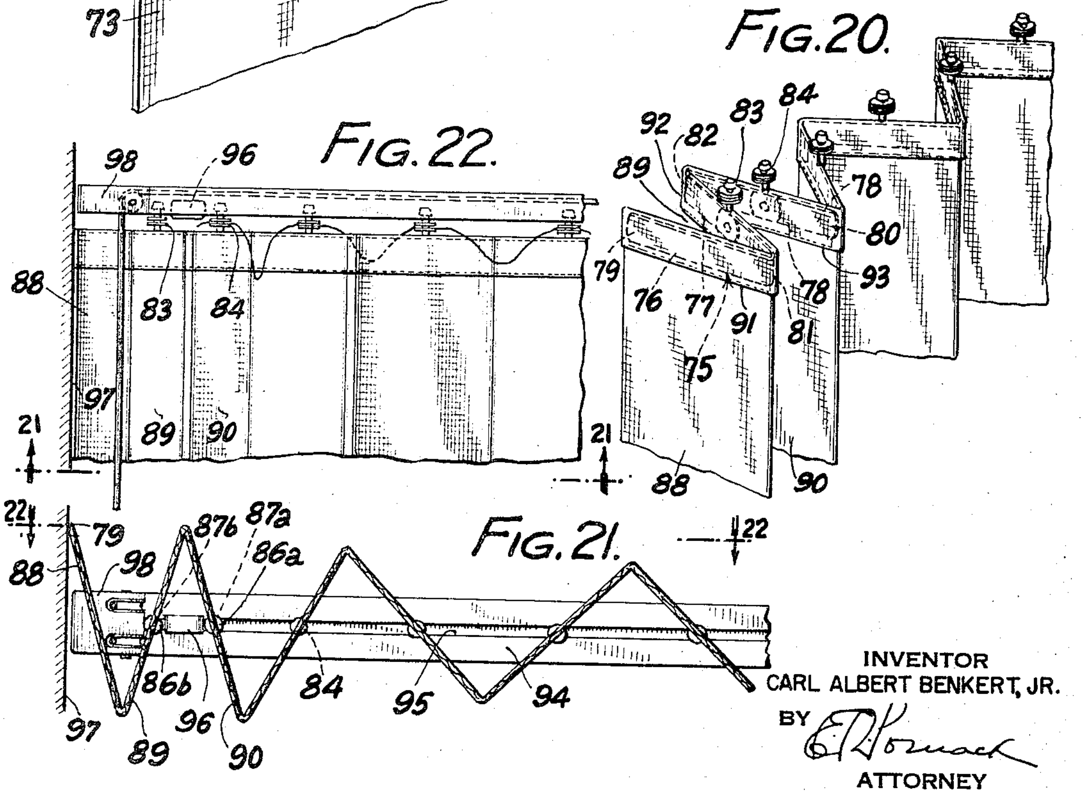
FIG. 20 is a fragmentary perspective view of a portion of a curtain construction according to my invention and embodying the device of FIG. 19.
FIG. 21 is a fragmentary horizontal section through the heading of the curtain construction according to FIG. 20, showing the curtain in operative relation to a window side wall and an upper track, the section being taken substantially along line 21—21 of FIG. 22.
FIG. 22 is a fragmentary front sectional elevation of FIG. 21, the section being taken substantially along line 22—22.

FIGURE 18 shows another simplified form of my invention in which the combination stiffener and carrier member 72, corresponding to the above-described member 25 (see FIG. 11), is fastened directly to the outer surface of the upper portion of the panel 73, instead of being positioned within a hem as in the form first above described. In the structure illustrated, the said member 72 is attached to the panel member 73 by stitching 74.

FIGURES 19 to 22 illustrate the use of a device in conjunction with the end panels of my curtain construction when it is desired to clear a pulley fitting at the end of the track member. Said device comprises, in the particular embodiment shown, a relatively stiff strip member 75 bent into three sections 76, 77 and 78 to form a Z-shaped member with terminals 79 and 80 and front and rear bent edges 81 and 82, respectively. Sections 77 and 78 support the respective carrier members 83 and 84, these being preferably fixedly secured in place, as by rivets 85. Said carrier members have upwardly extending stems supporting tape retaining means 86*a* and 86*b* and slide members 87*a* and 87*b*.

The said Z-shaped member 75 is attached to the three panels 88, 89 and 90, the particular embodiment shown having the said sections 76, 77 and 78 positioned within the respective pockets 91, 92 and 93. In operatively connecting the construction to the track member 94, the two slide members or knobs 87*a* and 87*b* are operatively inserted through the track slot 95 in straddling relation to the fixedly secured pilot 96, the terminal 79 being in abutment with the window wall 97. In this position, the end panel, operatively supported by the cantilever action of said strip section 76, is positioned below the conventional pulley fitting 98 at the end of track 94 and adjacent the said wall 97. The said end panel is at all times maintained in engagement with wall 97 because said knobs 87*a* and 87*b* are held against sliding movement relative to the track by the said pilot 96—a movement to the right (see FIG. 21) being prevented by the engagement of the carrier member 83 (supporting knob 87*b*) with said pilot 96, and a movement to the left being prevented by the engagement of the carrier member 84 (supporting knob 87*a*) with said pilot 96. Said panel 88 thus not only clears said end pulley fitting 98, but at all times keeps the window space between panel 89 and wall 97 closed.

In each of the forms of the invention described, an attractive curtain construction is presented with permanently pleated sections, and without the bulkiness of loose and soft fold constructions characteristic of conventional curtains of this general category. The constructions illustrated are provided with a simple heading treatment, with folds extending downwardly in sharply defined parallel lines making such construction particularly adaptable for modern decorative designs, as well as traditional decors. Due to the accordion-pleated construction, the effect is one of fullness; and due to the above-described flexible expansion-limiting tape arrangement, it is not only possible to move the curtains between fully retracted and predetermined maximum expanded positions, but also to maintain the fold lines at predetermined uniformly spaced intervals. The use of the combination stiffener and carrier member of the form first above described provides a relatively simple, unitary and inexpensive construction, making it unnecessary to purchase and separately assemble carrier and slide members—an operation which often requires considerable dexterity and manipulative skill. The second form of my invention illustrated enables a relatively simple stiffener member to be used for the heading in coactive relation with the carrier member serving both as a tape-holder and slide member. The said tape, being at the top of the curtain, is in unobstructing and in non-interfering relation both with the folding and unfolding operations of the curtain and the sliding action thereof. The other forms of my invention serve their intended special functions while providing the essentail advantages above described.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:

1. In a curtain construction, a pleated body portion comprising a plurality of accordion-folded panels presenting a plurality of vertical fold edges, carrier members at the upper portions of said panels adapted for slidable engagement with suitable traverse track means, and a flexible expansion-limiting tape extending over the tops of said respective panels and attached to said carrier members at points above and in spaced relation to said panel tops, said tape being of such length and so positioned that when fully extended it will hold said panels in predetermined maximum angular relation to one another, whereby said pleated body portion will be restrained against further expansion, said tape when in a non-extended position having its free and unattached portions gravitationally extending down between the respective panels, each of said carrier members having an upwardly extending stem, a slide element carried by each of said stems, and means on said stems above and in spaced relation to the upper edges of said respective panels for supporting said tape above said edges of said panels, said tape having along its longitudinal extent a plurality of spaced apertured portions mounted over said stem and supported by said retainer means, whereby the respective supported portions of said tape are in non-contiguous relation to the respective panels.

2. In a curtain construction, a pleated body portion comprising a plurality of accordion-folded panels preseting a plurality of vertical fold edges, carrier members at the upper portions of said panels adapted for slidable engagement with suitable traverse track means, and a flexible expansion-limiting tape extending over the tops of said respective panels and attached to said carrier members at points above and in spaced relation to said panel tops, said tape being of such length and so positioned that when fully extended it will hold said panels in predetermined maximum angular relation to one another, whereby said plated body portion will be restrained against further expansion, said tape when in a non-extended position having its free and unattached portions gravitationally extending down between the respective panels, each of said carrier members having an upwardly extending stem, a slide element and tape retainer means carried by said stem, said respective tape retainer means each comprising a pair of spaced retainer elements positioned between said slide element and the upper edge of the corresponding panel and in spaced relation to said upper edge said tape having along its longitudinal extent a plurality of spaced relatively narrow apertured portions mounted over said respective stems and positioned between said respective pairs of retainer elements.

References Cited

UNITED STATES PATENTS

| | | | |
|---|---|---|---|
| 1,597,758 | 8/1926 | Boye | 160—344 |
| 2,687,170 | 8/1954 | Johnson | 160—349 X |
| 2,754,901 | 7/1956 | Madsen | 160—84 |
| 2,806,525 | 9/1957 | Stankewich et al. | 160—84 |
| 2,959,247 | 11/1960 | Sare et al. | 160—199 X |
| 2,994,371 | 8/1961 | Morseth et al. | 160—199 X |
| 3,062,277 | 11/1962 | Merrill | 160—84 |
| 3,090,431 | 5/1963 | Stubblefield | 160—348 X |
| 3,157,907 | 11/1964 | Stall | 160—345 X |
| 2,309,147 | 1/1943 | Wilkinson | 52—238 |
| 2,667,218 | 1/1954 | Collins | 160—84 |
| 2,717,033 | 9/1955 | Breslow et al. | 160—84 |
| 2,891,612 | 6/1959 | Johnson et al. | 160—84 |
| 3,145,765 | 8/1964 | DeJong | 160—231 |

FOREIGN PATENTS

| | | |
|---|---|---|
| 796,595 | 6/1958 | Great Britain. |

DAVID J. WILLIAMOWSKY, *Primary Examiner.*

DENNIS L. TAYLOR, *Examiner.*

HARRISON R. MOSELEY, *Assistant Examiner.*

UNITED STATES PATENT OFFICE
CERTIFICATE OF CORRECTION

Patent No. 3,369,589 February 20, 1968

Carl Albert Benkert, Jr.

It is hereby certified that error appears in the above numbered patent requiring correction and that the said Letters Patent should read as corrected below.

Column 6, line 46, before "means" insert -- retainer --.

Signed and sealed this 29th day of April 1969.

(SEAL)
Attest:

Edward M. Fletcher, Jr.
Attesting Officer

EDWARD J. BRENNER
Commissioner of Patents